Nov. 30, 1926.
W. R. UCHTMAN
EGG COOKER
Filed May 21, 1925     3 Sheets-Sheet 1
1,609,225
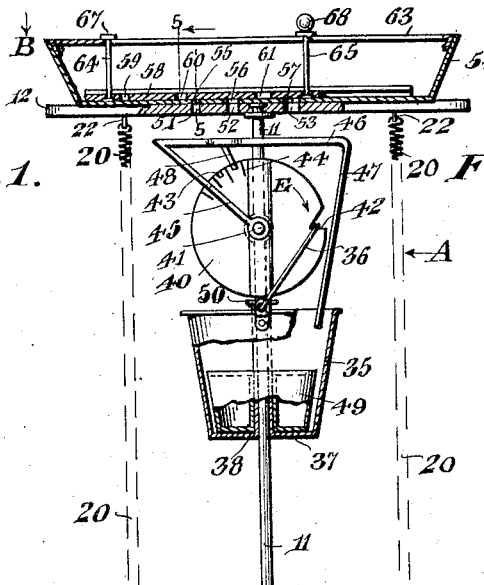
Fig.1.
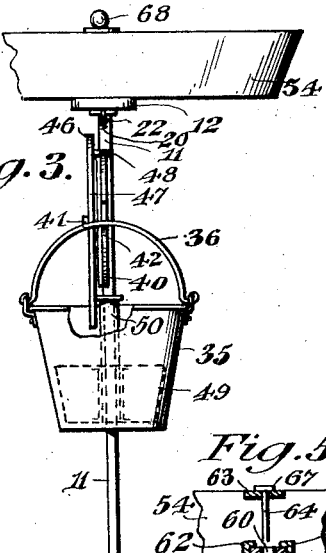
Fig.3.
Fig.5.
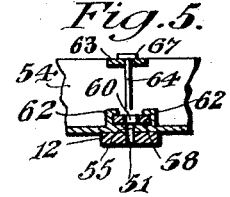
Fig.6.
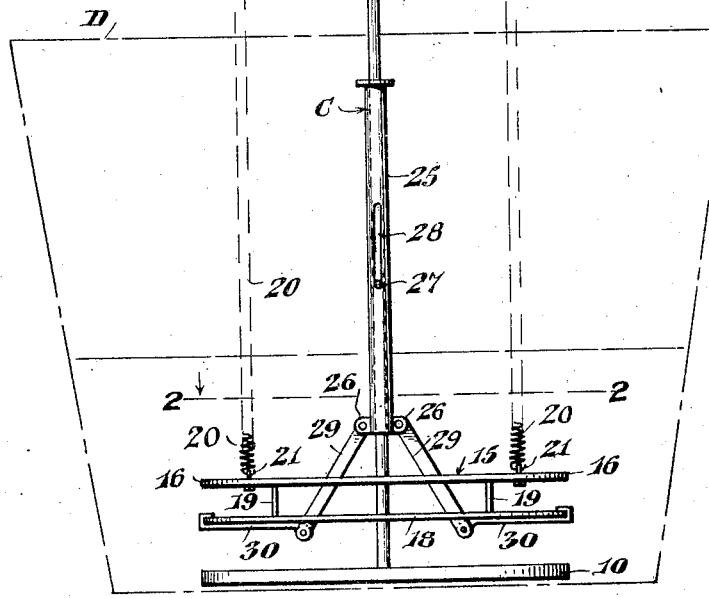
Fig.4.
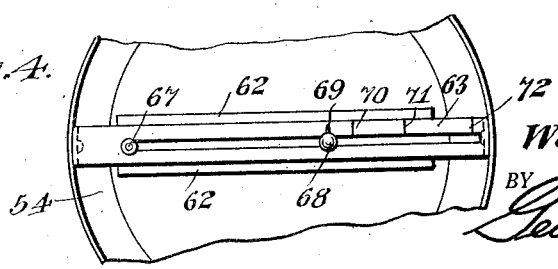
INVENTOR.
Weet R. Uchtman,
BY Geo. P. Kimmel
ATTORNEY.

Nov. 30, 1926.  1,609,225
W. R. UCHTMAN
EGG COOKER
Filed May 21, 1925   3 Sheets-Sheet 2
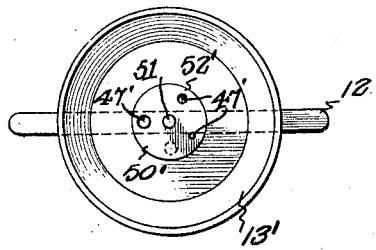
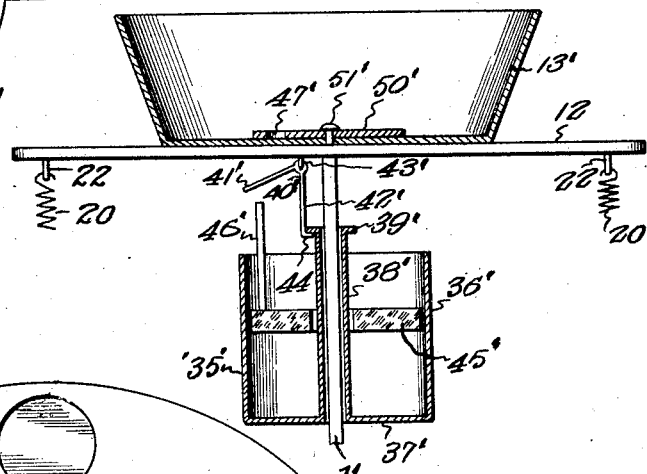
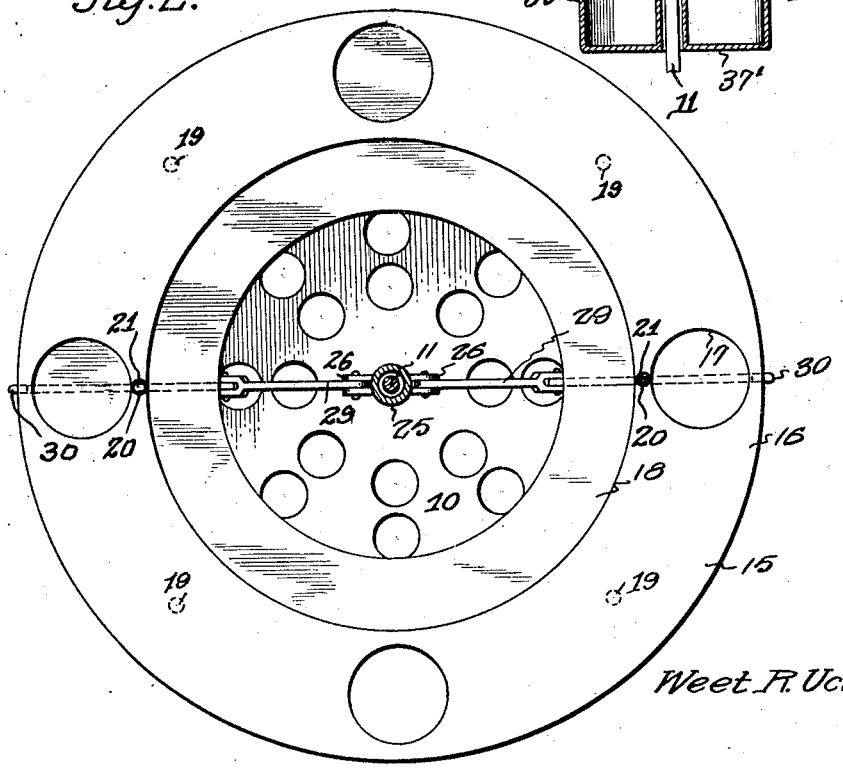
Inventor
Weet R. Uchtman,
By Geo. P. Kimmel, Attorney

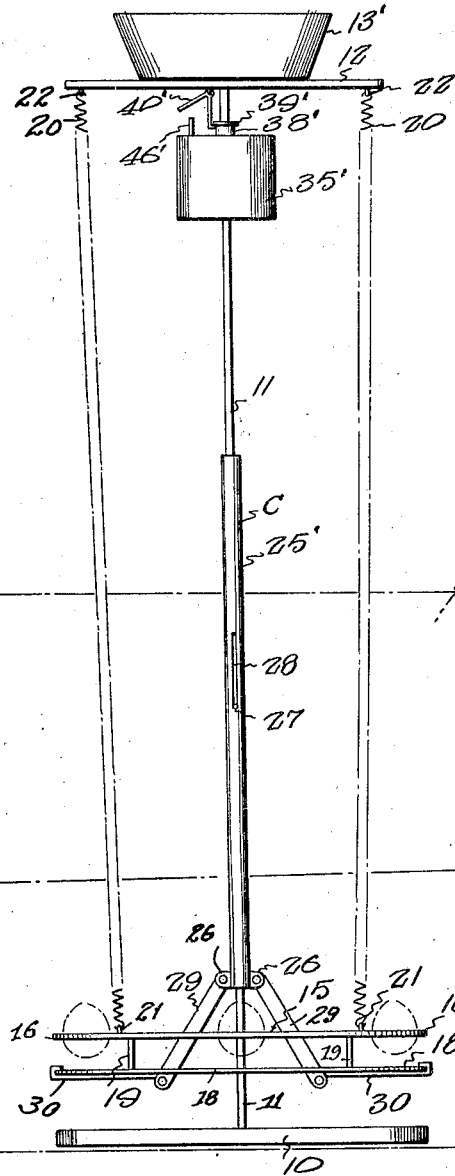

Patented Nov. 30, 1926.

1,609,225

UNITED STATES PATENT OFFICE.

WEET R. UCHTMAN, OF NEW BRITAIN, CONNECTICUT, ASSIGNOR OF ONE-HALF TO OLE M. DAHL, OF BOSTON, MASSACHUSETTS.

EGG COOKER.

Application filed May 21, 1925. Serial No. 31,886.

This invention appertains to a novel egg cooking device and the primary object of the invention is to provide an improved means for lifting the eggs being cooked out of a cooking vessel after a predetermined time, so as to insure the cooking of the eggs to the desired degree according to the individual taste of a person.

A further object of the invention is the provision of a novel egg cooker embodying a minimum number of parts and in which the necessity of providing a clock mechanism for moving the eggs from the boiling water is entirely eliminated.

A further object of the invention is the provision of an egg cooker embodying a standard adapted to fit directly within the cooking receptacle having novel means slidably associated therewith for receiving the eggs to be cooked, a novel means for lifting the egg support out of the water after a predetermined length of time, said means including a gravity movable member for releasing the egg support.

A further object of the invention is the provision of novel means for releasing the gravity operated means at the desired time, said means including a float operated latching mechanism, the float being adapted to be raised by liquid flowing into said gravity movable member.

A further object of this invention is the provision of novel means for controlling the flow of water into the said gravity movable means whereby the latching mechanism will be operated at predetermined times, according to whether the eggs are to be boiled soft, medium or hard.

A still further object of the invention is to provide a novel egg boiling device of the above character, which will be durable, thoroughly efficient in its use, readily set up, and one which can be placed upon the market at a small cost.

With these and other objects in view, the invention consists in the novel construction, arrangement and formation of parts, as will be hereinafter more specifically described, claimed, and illustrated in the accompanying drawings, in which—

Figure 1 is a sectional elevation of the improved egg cooking device showing the same positioned in a cooking receptacle, the receptacle being shown in dotted lines.

Figure 2 is a section on line 2—2, Figure 1.

Figure 3 is a fragmentary view, in side elevation, of the upper portion of the device looking in the direction of arrow A.

Figure 4 is a fragmentary view, in plan, looking in the direction of arrow B.

Figure 5 is a section on line 5—5, Figure 1.

Figure 6 is a fragmentary view, in vertical section of a modified form of float operated releasing mechanism for the gravity movable means which releases the latching mechanism for the egg carrier.

Figure 7 is a side elevation of the egg cooker in operative position and provided with still another form of float operated releasing mechanism.

Figure 8 is a top plan view of the means for controlling the flow of liquid to the float operated releasing mechanism employed in Figure 7.

Figure 9 is a vertical sectional view of the water controlling means and float operated releasing mechanism shown in Figure 7.

Referring to the drawing in detail, where in similar reference characters designate corresponding parts throughout the several views, the letter C generally indicates the improved egg cooking apparatus and D a receptacle with which the same can be associated. The receptacle D can be of any preferred type or character and therefore a detail description is deemed unnecessary.

The improved egg cooker as set forth by Figures 1 and 7 each includes a disk shaped supporting base 10, which can be perforated to decrease the weight thereof and to facilitate the placing of the same in the receptacle D. Rigidly secured to the axial center of the base 10 is the upright standard 11, which is preferably shaped circular in cross section and this standard is of a sufficient height to protrude an appreciable distance beyond the upper edge of the said receptacle. The extreme upper end of the standard 11 has rigidly secured thereto a cross rod 12 on which is fitted a water receptacle 54, the use of which will be hereinafter more fully described.

Slidably associated with or movable in a horizontal plane on the standard 11 is the novel egg carrier or support 15. This egg carrier or support 15 embodies an upper annular plate 16 provided with any preferred number of openings 17 for receiving the eggs to be cooked. This upper plate 16 is arranged directly above and in spaced relation to a lower annular plate 18 which is of a slightly greater width than the upper plate 16 and which is formed of imperforate material. These annular plates 16 and 18 are rigidly connected together in any preferred way such as by the use of posts 19.

Means is provided for normally raising the egg carrier or support out of the water in the receptacle D, and this means embodies a plurality of contractile coil springs 20 which have their lower terminals secured to eyes or the like 21 carried by the annular plate 16, and their upper ends are secured to eyes 22 carried by the terminals of the cross rod 12.

In order to normally hold the egg carrier in the boiling water against raising movement by the contractile coil springs, a novel latch mechanism is provided. This latch mechanism includes a sleeve 25 slidably mounted on the standard 11 and the lower end of the sleeve is provided with ears 26 projecting radially therefrom. If preferred the sliding movement of the sleeve 25 can be limited by the use of a pin 27 rigidly carried by the standard 11 operating in a slot 28 formed in the sleeve. The ears 26 have pivotally connected thereto outwardly inclined links 29, the lower ends of which pivotally carry hooks 30 which are adapted to hook over the marginal edge of the lower annular plate 18. When the hooks 30 are placed in engagement with the said annular plate 18, the same will be normally held in contact therewith owing to the contractile springs 20 which will exert a binding force against said hooks. It is obvious however that when the sleeve 25 is slid downward, that the links 29 will tend to spread outwardly carrying the latches 30 therewith and out of engagement with said lower plate 18, thereby releasing the egg carrier so that it will be elevated above the body of water in the receptacle C.

Referring to Figures 1, 2 and 5 of the drawings, there is illustrated in such figures, a gravity movable element for actuating the sleeve 25 to release the latch mechanism, a float operated releasing mechanism for normally retaining the gravity movable element in an elevated position, and a water supply controlling device coacting with the gravity movable element and the releasing mechanism for the latter.

The gravity movable element is in the form of a bucket or pail 35, provided with a bail 36. The bottom 37 of the bucket 35 is formed with an opening 38 and integral with the upper face of the bottom 37, as well as registering with the wall of the opening 38 is a vertically disposed guide sleeve 39.

The float operated releasing mechanism for the bucket 35 comprises a disk 40, loosely mounted on a rock shaft 41 journaled in the standard 11. The disk 40 is notched as at 42, for the reception of the upper end of the bail 36 to retain the bucket 35 in an elevated position. The disk 40 has its edge formed with a series of notches or sockets 43, each having a suitable indication 44 associated therewith. Fixed to the shaft 41, is a releasing lever for the disk 40, and said lever consists of an upwardly extending and outwardly inclined arm 45 which terminates at its upper end in one end of a horizontally disposed arm 46, and the latter merges into a downwardly extending and inwardly inclined arm 47 which is of a length to extend into the bucket 35. The arm 46 is provided with a lug 48 selectively engaging in any one of the notches or sockets 43 for locking the disk 40 from shifting in the direction of the arrow E, to prevent the releasing of the bail 36 whereby the bucket 35 is normally maintained in an elevated position, and retained in such position until the lug 48 is moved from engagement in a socket or notch 43, and when such action takes place the disk 40 will be shifted by the weight of the bucket 35, the bail 36 passes out of the notch 42 and the bucket 35 will move downwardly on the standard 11, engaging the sleeve 39 and release the latch mechanism for the egg carrier. Arranged within the bucket 35 is a float 49 adapted to move upwardly, on the supply of water to the bucket 35, and on the upward movement of the float 49, it will engage the lower end of the arm 47, shift the lever of which said arm 47 forms a part and removes the lug 48 from engagement in the socket 43, and under such conditions releases the disk 40. When the bucket 35 moves downwardly the water supplied thereto and the float arranged therein are carried bodily with the bucket. To prevent the float 49 from passing off the sleeve 39, the latter is provided at its upper end with an annular flange 50.

The cross rod 12 is formed with a series of openings, preferably three in number and which are indicated at 51, 52 and 53. The opening 51 is smaller in diameter than the opening 52, and the latter is smaller in diameter than the opening 53. These openings are provided for the supply of water to the bucket 35 and the diameters thereof are such as to control the flow. Secured to the cross rod 12 is a water receptacle 54, having its bottom provided with openings corresponding in number to the openings formed in the cross rod 12. Each of the openings in the bottom of the receptacle 54 registers with an opening in the cross rod 12 and is of the same diameter as such opening. The openings in the bottom of the receptacle 54 are indicated at 55, 56 and 57.

For the purpose of controlling the discharge of water from the receptacle 54, a controlling slide 58 is provided and which is formed with openings corresponding in number to the openings in the bottom of the receptacle 12. The openings in the slide 58 are indicated at 59, 60 and 61, which correspond in diameter respectively to the openings 55, 56 and 57. Secured to the bottom of the receptacle 54, is a pair of spaced opposed guide members 62 for the slide 58. Connected to the top of the receptacle is a diametrically disposed slotted guide bar 63 for a pair of vertical posts 64, 65 which are fixed to the slide 58. The posts 64, 65 have a head 67 which overlaps the bar 63 and extending from the head 67 of the post 65 is a handle piece 68 provided with a pointer 69 coacting with a series of indicators 70, 71 and 72 formed on the upper face of the bar 63.

The indicators are three in number, or rather the number of the indicators correspond to the number of openings in the slide 58. The openings in the slide 58 are so disposed that only one of them will register with an opening in the bottom of the receptacle. The arrangement is such that when the slide is shifted to position the pointer at the indicator 70 the opening 61 will register with the opening 57. When the pointer 69 registers with the indicator 71 the opening 60 will register with the opening 56 and when the pointer registers with the indicator 72 the opening 59 will register with the opening 55. From the foregoing arrangement the discharge of water from the receptacle 54 into the bucket can be controlled, that is to say the flow will be slow when the opening 59 is employed, somewhat quicker when the opening 60 is employed, and decidedly quicker when the opening 61 is employed. This provides for the egg carrier to be held within the body of water in the receptacle D for predetermined periods of different intervals, depending upon what period the eggs are to be cooked.

Figure 6 illustrates a different form of float operated releasing mechanism for the bucket 35, and such mechanism includes a float 73 arranged in the bucket 35 and guided on the sleeve 39. Secured to the float is an actuating member 74 adapted to engage and actuate a latch member 75, pivoted as at 76, to the standard 11, and formed with a hook 77 engaging in a socket 78, formed in the rim of a wheel 79, which is loosely mounted on a stub shaft 80 secured to the standard 11. The wheel 79 is provided with a lug 81 engaged by the bail 36 for maintaining the bucket 35 normally in an elevated position.

When the water is supplied to the bucket 35, the float 73 moves upwardly so that the member 74 will engage and shift the latch member 75, from engagement with the wheel 79, thereby releasing the latter and permitting the bucket 35 to fall.

The difference between the construction shown in Figures 7, 8 and 9 and that illustrated in the other figures of the drawings, relates solely to the float operated releasing mechanism for the gravity movable element and further a change in the water control means.

Referring to Figures 7, 8 and 9 the gravity movable element or member is indicated at 35', and is in the form of a cup or container. The member 35' includes an outer wall 36', and a bottom wall 37' which supports an axially disposed sleeve or hollow hub 38' slidably mounted upon the standard 11. An outwardly directed annular flange 39' is formed on the upper end of the hub 38' of the member 35', as can be readily seen by referring to Figure 9 of the drawings. It is also preferred to have the hub 38' projecting above the upper edge of the said gravity operated member. This gravity operating member is normally held in a raised position by the use of a latch 40' which includes a pair of angular related arms 41' and 42', and the latch is pivoted at its angle, as at 43' to the cross bar 12. The depending arm 42' is provided with a detent 44' for engaging under the annular flange 39' of the hub. Arranged within the gravity operated member 35 is an annular float 45'. The upper face of the float 45' carries an upwardly extending rod 46' which is disposed in the path of the arm 41' of the latch 40', and thus it can be seen that when the gravity operated member is filling with liquid, that the float 45' will rise, causing movement of the arm 46' to contact with the latch 40', swinging the same on its pivot 43', which will carry detent 44' out of engagement with the flange permitting the dropping of the said member.

Carried by the cross rod 12 is a receptacle 13' adapted to receive a desired quantity of liquid and the bottom of the receptacle is provided with an outlet opening 47' to permit the draining of the water from the receptacle into the gravity operated member 35' to cause the operation of the float 45'.

It can be seen that the amount of flow of water from the receptacle into the member 35' controls the time for the release of the said gravity operating member in order to permit the eggs to be boiled different lengths of time. For controlling the flow of water from the receptacle 13' there is provided a disk 50' which is rotatably mounted at its axial center on a pivot pin 51' arranged at the axial center of the receptacle 13'. This disk 50' is provided with a plurality of openings 52' of different sizes and by turning the disk, the desired size opening can be brought into registration with the opening in the bottom of the receptacle.

Preferably three openings are provided for controlling the discharge of water from the receptacle 54 of 13' and the largest opening is used when boiling the eggs soft, the medium size opening when boiling the eggs medium hard and the smallest opening when it is desired to boil the eggs hard.

The floats 49, 73 and 45' can be formed of cork or of a type of air float, but it is to be understood that the floats can be constructed in any suitable manner. The gravity movable members are provided with drains.

In the use of an egg cooker in accordance with this invention, the desired number of eggs are placed in the openings 17, and the cooker positioned within the receptacle D with the eggs submerged within the body of water within said receptacle. Prior to the positioning of the device within the receptacle D, the egg carrier 15 is moved to its lower-most position and the latches or hooks are engaged under the bottom plate 18 and are maintained in engaged position by the springs 20. The gravity movable element or member is raised and latched in elevated position. The water supply is then opened for the desired flow and as the water is discharged in the gravity movable element, the float therein will gradually rise until the latching mechanism is released, whereby the gravity movable element or member will fall and impact against the sleeve 25 thereby releasing the latching member 30, so that the springs 20 will elevate the egg carrier clear of the water in the receptacle D.

It will be noted that owing to the formation of the bottom plate 18 that the raising movement of the egg carrier will be retarded somewhat and which will prevent the too rapid elevating of the carrier through the water in the receptacle D. When the carrier is in its raised position above the water, the lower plate 18 will form an effective screen for preventing steam from coming into contact with the egg.

It is thought the many advantages of the egg cooker, in accordance with this invention, can be readily understood, but although the preferred embodiments of the invention are as illustrated and described, yet it is to be understood that changes in the details of construction can be had which will fall within the scope of the invention as claimed.

Having thus described my invention, what I claim as new is:

1. An egg cooking apparatus comprising a standard, an egg carrier formed of a pair of superposed spaced plates connected together and movable relative to the standard, means normally tending to raise the egg carrier on the standard, latches normally extending through said plates and engaging with the lower of the plates for normally holding the egg carrier against movement on the standard when in a lowered position, and means for releasing the latches at predetermined periods.

2. In an egg cooking apparatus, an egg carrier formed of a pair of superposed spaced plates connected together, means normally tending to move the egg carrier to a raised position, releasable means extending through the plates and engaging with the lower of the plates for normally holding the carrier against movement when in a lowered position, gravity operated means for operating said releasing means, and means for permitting downward movement of said gravity operated means at predetermined periods.

3. In an egg cooking device, an egg carrier, means normally tending to raise the egg carrier to an elevated position, releasable means extending through said plates and engaging with the lower of the plates for holding the egg carrier against movement when in a lowered position, a gravity operated member for actuating said relasing means, a latching mechanism including a normally latched disk for holding the gravity operating member in a raised position, a buoyant releasing element for said latching mechanism mounted in the gravity operating member, and means for controlling the flow of a fluid into the gravity operated member to provide for the activity of said element.

4. An egg cooking apparatus comprising a standard, an egg carrier formed of a pair of superposed spaced plates connected together and movable relative to the standard, means connected with the upper of said plates for normally tending to raise the egg carrier on the standard, a latching mechanism slidably mounted on the standard and further extending through said plates and engaging with the lower of the plates for holding the egg carrier from movement on the standard when in a lowered position, a gravity operated member slidably mounted on the standard for actuating said latching mechanism to released position, a latching mechanism for normally retaining the said gravity operated member in elevated position and including a normally locked shiftable disk for supporting said member, a buoyant releasing element for the latching mechanism for said member, said releasing element mounted in said member, and means for controlling a flow of liquid into said member to provide for the activity of said element to release the latching mechanism for said member.

5. In an egg cooking device, a vertically movable spring controlled egg carrier, a latching mechanism engaging with said carrier for maintaining it in a lowered position, a gravity operated member for actuating said latching mechanism to released position to provide for the vertical movement of said carrier, a latching mechanism for normally holding said member in a raised position and including a normally locked shiftable disk for suspending said member, a bouyant releasing element mounted in said member, and means for supplying fluid to said member to provide for the activity of said element to shift the latching mechanism for the member to released position causing thereby operation of the latching mechanism for the carrier by said member.

6. An egg cooking apparatus comprising a standard, a support at the top thereof, an egg carrier vertically movable on said standard, controlling springs between said standard and egg carrier, a latching mechanism slidably mounted on said standard and extending through and engaging with the carrier for maintaining it in a lowered position against the action of said springs, a gravity operated member slidably mounted on said standard for actuating said latching mechanism to release the carrier, a latching mechanism engaging with said member for normally maintaining it in raised position, a buoyant releasing element for the latching mechanism for said member and mounted in the latter, and means mounted on said support for supplying liquid to said member to provide for the activity of said element to release the latching means for said member.

In testimony whereof I affix my signature hereto.

WEET R. UCHTMAN.